(12) United States Patent
Cheng et al.

(10) Patent No.: US 9,632,914 B2
(45) Date of Patent: Apr. 25, 2017

(54) ERROR DIAGNOSTIC IN A PRODUCTION ENVIRONMENT

(71) Applicant: International Business Machines Corporation, Armonk, NY (US)

(72) Inventors: Chin-Teng Cheng, Taipei (TW); Ying-Hsien Lee, Taipei (TW); Chih-Hsiung Liu, Taipei (TW); Min-Tsung Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 14/718,295

(22) Filed: May 21, 2015

(65) Prior Publication Data

US 2016/0342499 A1 Nov. 24, 2016

(51) Int. Cl.
*G06F 11/00* (2006.01)
*G06F 11/36* (2006.01)

(52) U.S. Cl.
CPC ........ *G06F 11/3644* (2013.01); *G06F 11/366* (2013.01); *G06F 11/3664* (2013.01)

(58) Field of Classification Search
CPC ............... G06F 11/366; G06F 11/3664; G06F 11/3644; G06F 11/3684
See application file for complete search history.

(56) References Cited

U.S. PATENT DOCUMENTS

| | | | |
|---|---|---|---|
| 5,371,878 A * | 12/1994 | Coker | G06F 11/3636 703/28 |
| 6,769,054 B1 | 7/2004 | Sahin et al. | |
| 6,981,180 B1 | 12/2005 | Bailey et al. | |
| 7,660,412 B1 | 2/2010 | Lee | |
| 8,028,201 B2 | 9/2011 | Anna et al. | |
| 8,380,665 B2 | 2/2013 | Papadomanolakis et al. | |
| 8,762,777 B2 | 6/2014 | Gotoh et al. | |
| 2005/0289397 A1 * | 12/2005 | Haruki et al. | G06F 11/3648 714/38.1 |
| 2006/0277441 A1 * | 12/2006 | Edgar et al. | G06F 11/3664 714/38.1 |
| 2007/0276938 A1 | 11/2007 | Ottamalika et al. | |
| 2008/0215922 A1 | 9/2008 | Cheng et al. | |

(Continued)

OTHER PUBLICATIONS

Mell et al., "The NIST Definition of Cloud Computing," National Institute of Standards and Technology, U.S. Department of Commerce, Special Publication 800-145, Sep. 2011.

(Continued)

*Primary Examiner* — Michael Maskulinski
(74) *Attorney, Agent, or Firm* — Laura E. Gisler

(57) ABSTRACT

Troubleshooting data can be collected to debug a computer appliance running in a production environment. A computer system can record inbound and outbound transactions and monitor for the occurrence of an error. Upon detection of an error, transactional data associated with the error can be copied to a container. The relevant transactions and user sessions can be run in the container on debug firmware and rich troubleshooting data can be collected from the execution. If the same error occurs again during this simulated execution, then the troubleshooting data that was collected, as well a product key, can be encrypted and included in an error report. The container can then be deleted from the appliance.

18 Claims, 6 Drawing Sheets

(56) References Cited

U.S. PATENT DOCUMENTS

| | | | |
|---|---|---|---|
| 2008/0301651 A1* | 12/2008 | Seneski et al. | G06F 11/3664 717/135 |
| 2009/0089761 A1* | 4/2009 | Lazzaro et al. | G06F 11/3664 717/128 |
| 2013/0086557 A1 | 4/2013 | Alwar et al. | |
| 2013/0089761 A1* | 4/2013 | Schiemann et al. | H01M 2/0242 429/61 |
| 2014/0279918 A1 | 9/2014 | Han | |

OTHER PUBLICATIONS

Yuan et al., "Be Conservative: Enhancing Failure Diagnosis with Proactive Logging," Proceedings of the 10th USENIX Symposium on Operating Systems Design and Implementation (OSDI'12), pp. 293-306, USENIX Association Berkeley, CA, USA ©2012 ISBN: 978-1-931971-96-6.

* cited by examiner

ERROR DIAGNOSTIC IN A PRODUCTION ENVIRONMENT

BACKGROUND

The present disclosure relates to application troubleshooting, and more specifically, to troubleshooting in a production environment.

Debugging is a type of troubleshooting. Debugging is a methodical process that can include finding and reducing the number of "bugs" or defects in a computer program, a piece of electronic hardware, or in firmware, in order to make the computer program behave as expected. As software and electronic systems become generally more complex, the various common debugging techniques have expanded with more methods to detect anomalies assess impact, and schedule software patches or full updates to a system.

SUMMARY

Embodiments of the present disclosure may be directed toward a computer implemented method for performing troubleshooting of an appliance running in a production environment. The method may begin by the system recording transactional data, the transactional data comprising active transactions and active user sessions for the appliance. The system can then detect that an error has occurred in the appliance. The system can copy transactional data associated with the error to a container. The container can be a restricted environment that can run debug firmware. The system can then execute, on the debug firmware in the container, the active transactions and active user sessions associated with the error. During the execution, the system can collect troubleshooting data. Then, after determining that the same error has occurred in the executing on the firmware, the system can encrypt the troubleshooting data and a product key from the execution, and create a report that includes the encrypted troubleshooting data. Finally, the appliance can be deleted from the container.

Embodiments of the present disclosure may be directed toward a computer system for performing troubleshooting of an appliance running in a production environment. The computer system can at least one processor circuit. This circuit can have a transaction recording module that can record transactional data, the transactional data comprising active transactions and active user sessions for the appliance. The processor circuit can also have an error detecting module that can determine an error has occurred in the appliance and a network simulator module. The network simulator module can copy transactional data associated with the error for the appliance to a container. This container can be a restricted environment that is loaded with and can run debug firmware. The module can execute the active transactions and user sessions associated with the error on the debug firmware in the container. The circuit can also have an encrypting and reporting module that can collect troubleshooting data throughout the execution of the active transactions and active user sessions associated with the error on the debug firmware. The module can also determine that the error occurs in the executing on the debug firmware, and it can encrypt the troubleshooting data and a product key from the execution, and create a report that includes the encrypted data. Finally, the module can delete the appliance from the container.

Embodiments of the present disclosure may be directed toward a computer program product for performing troubleshooting of an appliance running in a production environment. The computer program product can have a computer readable storage medium with program instructions embodied therewith, wherein the computer readable storage medium is not a transitory signal per se, the program instructions may be executable by a computer processing circuit to cause the circuit to perform the method that beings by the system recording transactional data, the transactional data including active transactions and active user sessions for the appliance. The system can then detect that an error has occurred in the appliance. The system can copy transactional data associated with the error to a container. The container can be a restricted environment that can run debug firmware. The system can then execute, on the debug firmware in the container, the active transactions and active user sessions associated with the error. During the execution, the system can collect troubleshooting data. Then, after determining that the same error has occurred in the executing on the firmware, the system can encrypt the troubleshooting data and a product key from the execution, and create a report that includes the encrypted troubleshooting data. Finally, the appliance can be deleted from the container.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
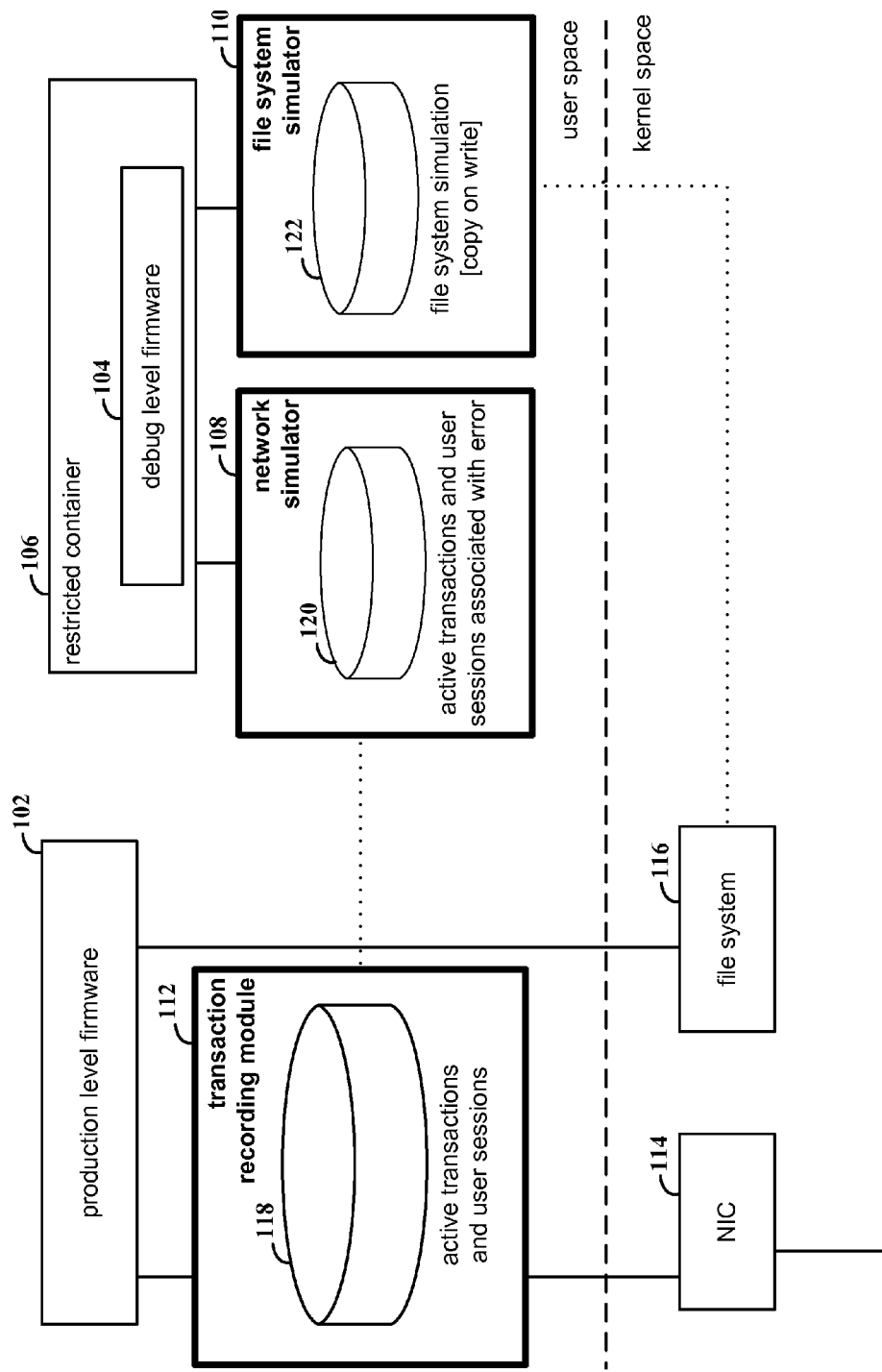
FIG. 1 depicts a system for troubleshooting an appliance in a production environment, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to appliance troubleshooting, more particular aspects relate to troubleshooting in a production environment. While the present disclosure is not necessarily limited to such applications, various aspects of the disclosure may be appreciated through a discussion of various examples using this context.

Applications (software) and their appliance counterparts (software and some hardware or firmware) can level their logging data to balance various resources consumptions such as system outage cost, labor cost, or others. The various levels may be suited for a particular stage of development, as each stage may occur in a different "environment." Many of the stages of development (e.g. testing, integration) enable for testing, feedback, and easy targeting of error-causing code. An application (or appliance) may be designed to handle staged logging levels such as production level, testing level, debug level, development level, etc. In the final stage of development or post-development stage, an appliance runs in a live or "production" environment. In a production environment, if an application processes too much logging data, this processing can affect the system resources, such as performance, memory, storage, etc., and thus production level of logging data may not be very detailed. For example, processing could be slowed down significantly.

Pinpointing issues in applications running in a production environment can present unique challenges that are not experienced when issues arise with an application running in a testing environment. In a testing or a debugging environment, the product (e.g. the application or the appliance), is running theoretically, while users may look for bugs, design flaws, or other issues with the application. By contrast, in a production environment the application is operating for its indented use by end users. Thus, in a production setting, an appliance may be set up and relied on for commercial operations, and so issues may need to be resolved quickly.

In order to resolve application issues quickly in a production environment, a support team may want sufficient information to diagnose and determine the root cause of the problem. For example, an issue may be caused by input transaction content, production system settings, system resource constraints and status, other applications installed on the system, conflicting libraries, or others. These issues may restrict a supporting engineer's ability to recreate the problem in a testing environment when attempting to do so following the steps provided by the customer experiencing the issue.

Embodiments of the present disclosure may facilitate troubleshooting in a production environment in a manner that can provide rich troubleshooting information to the support team as well as identify the root cause of appliance error (e.g. failure). An appliance may contain both production level and debug level firmware, with the latter being loaded in a restricted container environment. Debug level, as mentioned above, may be the most detailed method for debugging or troubleshooting a system. Most systems do not enable debug mode due to the fact that the logging is done at such a detailed level, and thus the system resource usage can be extremely expensive, utilizing a vast amount of system resources. Thus, running debug on the whole system can significantly reduce system performance.

Thus, the debug firmware can be run in a restricted container environment, a type of sandbox environment, which would isolate the processing occurring inside the container, and thus would be prevented from affecting the "live" or production system. The debug level firmware running in the restricted container environment can perform troubleshooting when an appliance error occurs. In order for the debug firmware to troubleshoot, the appliance may first be enabled to continuously buffer active transactions and record active user sessions in a buffer. Thus, transactional data comprising the active transactions and user sessions may be recorded upon initialization and deleted once they are no longer active, in order that the buffer might reflect the active transactions and user sessions at any particular time.

When an error occurs, the appliance can launch a container to run the debug firmware in a restricted environment. This containerized "restricted environment" can function as a sandbox environment, in that the processes being executed in the container will not impact the performance of the production system. A network simulator module and a file system simulation module can be associated with restricted container, in order to provide the container with the necessary data to allow it to function while still preventing the debug firmware from impacting the production system. Thus, the appliance can still appear fully functional from a production perspective throughout the troubleshooting process.

The network simulator module and the file system module can simulate the production environment for the debug firmware. For example, the network simulator module can, in the container, simulate the traffic flow found in the production environment. The file system module can simulate, in the container and for the debug firmware, the relevant portions of the system memory. Thus, the debug firmware can load the same configuration as production firmware, but the debug firmware can set the details log level to collect debugging data as well as developer defined data. An example of this developer defined data could include trace, which would otherwise not be enabled in a production environment. The network simulator module can replay the active transactions and active user sessions. Once an error is created (in the restricted container environment), the collected troubleshooting data can be encrypted with a product key. This encrypted data can be attached to the error report that is sent to the product support team, upon detection of an issue. The container can be deleted upon the creation of the report.

FIG. 1 depicts a system for troubleshooting an appliance in a production environment, according to embodiments of the present disclosure. The system can consist of both production level firmware 102 and debug level firmware 104. The application can be running on the production level firmware 102. When an application or appliance is set to production level, the product can be run with a focus on conserving system resources, in an effort to optimize performance, as a production level can be selected at an end-user run stage. In prioritizing performance and system resource conservation, data logs (which can be the source of troubleshoot data for product support teams) may be very sparsely populated. Debug level firmware 104 can include debugging data formats that can store enough information to allow source-level debugging.

A transaction recording module 112 can record transactional data including input/output (I/O) of active transactions in the production system (i.e. running on the production level firmware 102). The transaction recording module 112 can capture active user login sessions and capture the actions the user performs on the system and store them in a database or buffer 118. Active transactions can be removed from the buffer once the transactions are completed. Thus, the database or buffer 118 can contain copies of active transactions and user sessions, with the sessions being wiped upon becoming inactive. These recordings (of the active user sessions and transactions) can be packaged in "packets", which can then each be passed to a network simulator 108 to be provided to the debug level firmware 104 to playback and generate debug level trace whenever an error is encountered.

The debug level firmware 104 can be run inside of a restricted container 106. The use of a restricted container 106 in which to run the debug level firmware 104 can allow the debug functionalities to occur on the indicated basis without impacting the quality or speed of the production environment. This provides the system with the ability to isolate the environment that is created by the network simulator 108 and a file system simulator 110. The container 106 may not be launched until an error occurs in the production system and is detected on the production level firmware 102. The production can raise a quiesce or "stop" command to stop the current transaction. The system can then clone the production runtime to the restricted container 106, through use of the transaction recording module 112 sharing its current buffer 118 with the network simulator 108. In this way, the network simulator 108 can provide the debug level firmware 104 with a copy of the active transactions and user sessions associated with the error (here the active transactions and user sessions associated with the error may be stored in a database 120 within the network simulator 108), in order to reproduce the error in an isolated environment, using the same configuration, but with a debug trace level. Detailed troubleshooting data, including system calls, developer defined trace, and program stack information can be recorded.

The network simulator 108 can replay active transactions recorded by the transaction recording module 112, the sessions stored in a database 120. The network simulator 108 can simulate the real network status (e.g. latency) and a sequence of transactions. If an error is recreated, the network simulator 108 can simulate active transactions one-by-one in order to identify the root cause of the error. The network simulator 108 can also monitor all outgoing traffic initiated by the container 106. It can simulate both network latency and it can either run active transactions or user sessions one by one or in parallel.

The file system simulator 110 can be used to mount the file system 116 to the container in a copy-on-write manner. This allows the simulation running on the debug firmware 104 (in the restricted container 106) to have access to the real data. However, the use of copy-on-write ensures that the simulation does not impact the production system. For example, if the simulation is using and directs a modification be made to a particular file (which may also be used by the system in the production environment), the system can create and modify only a local copy. Here, the local copies could be created and stored by the file system simulator 110 in a database 122. Thus, the system can run the simulation, using exact copies of the real data accessed from the file system 116, within the restricted container 106 on the debug level firmware 104, without impacting the processes running on the production level firmware 102 or the system as whole.

As indicated in the figure, the production level firmware 102, the transaction recording module 112, the restricted container 106, the debug level firmware 104, the network simulator 108, and the file system simulator 110 can all be run in the user space. By contrast, the NIC 114 and the file system 116 can all exist in the kernel space. Thus, the file system simulator's utility is further illustrated, in that it can provide to the debug level firmware 104, an accurate representation of the relevant portion of the file system 116, which would otherwise be inaccessible and unknown to an appliance running in the user space. The transaction recording module 12 may also connect with a network interface controller (NIC) 114, in the kernel space. The NIC 114 may connect the system to an external network.

Figure 2:
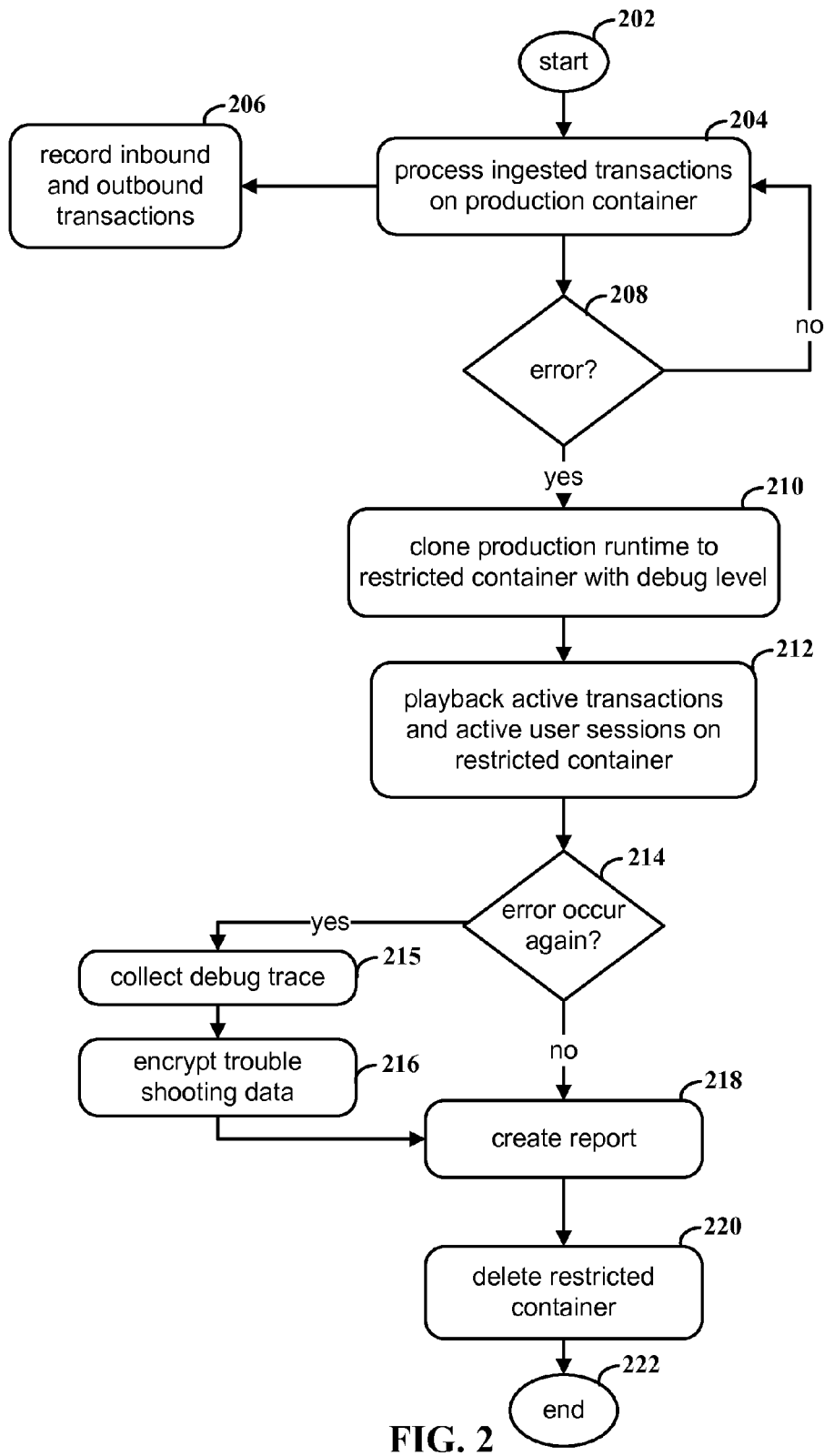
FIG. 2 depicts a flow diagram for troubleshooting an appliance in a production environment, according to embodiments of the present disclosure.

FIG. 2 depicts a flow diagram for troubleshooting an appliance in a production environment, according to embodiments of the present disclosure. The method can start at 202. The system can process ingested transactions on a production container, per 204. As the transactions are being processed, transactional data including the inbound and outbound transactions (i.e., input and output) can be recorded, per 206. This part can be conducted by, for example, the transaction recording module 112 and stored in the active transactions and user sessions database 118 of FIG. 1. As described herein, the sessions may be removed from the database 118 once they are no longer active. During the processing and recordation of transactions, an error may occur and be detected, per 208. If an error occurs, the production runtime may be cloned to the restricted container (which contains the debug level firmware, as shown in FIG. 1), per 210. In the restricted container, the system can then playback active transactions and active user sessions, on a case-by-case basis, in order to precisely detect the source of the error, per 212. If the error occurs again (i.e., during the replay in the restricted container), at 214, debug trace data can be collected, per 215 and the troubleshooting data can be encrypted, per 216 and added to the error report, per 218. If no error occurs during the replay of the transactions and active user sessions associated with the error at 214, the system can create an error report, per 218. The error report created when the error does not reoccur in the debug firmware can be called a no debug report.

Whether or not trouble shooting data was gleaned, encrypted, and included in the error report at 218, the restricted container can then be deleted per 220 and the method can end, per 222. This error report can be sent to a product or appliance support team to be used in troubleshooting the particular error that occurred in the appliance.

Figure 3:
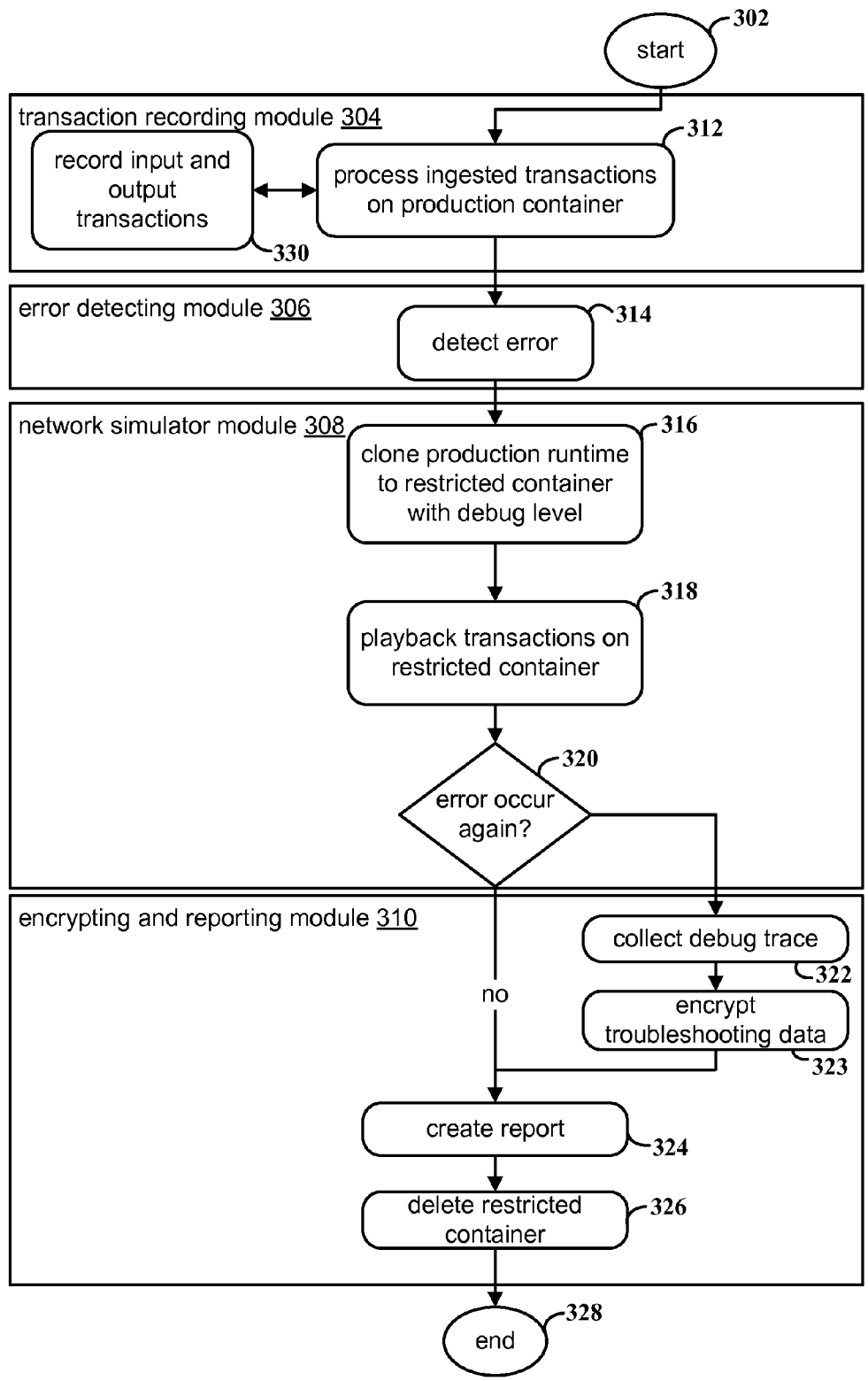
FIG. 3 depicts a method for troubleshooting an appliance in a production environment, with various modules highlighted, according to embodiments of the present disclosure.

FIG. 3 depicts a method for troubleshooting an appliance in a production environment, with various modules highlighted, according to embodiments of the present disclosure. A number of modules are shown, which may correspond to the modules of FIG. 1, including: transaction recording module 304, an error detecting module 306, a network simulator module 308, and an encrypting and reporting module 310.

The method can begin at the start 302. The transaction recording module 304 can process ingested transactions on a production container (i.e. in the production environment), per 312 and record the input and output transactions, per 330. The error detecting module 306 can detect an error in the production environment, per 314. This error could be a system failure or another error. Prior to an error report being sent to the team supporting the application, the network simulator module 308 can clone the production runtime data to a restricted container which can have a debug level, without impacting the processing in the production environment, per 316. The network simulator module 308 can then playback transactions on the restricted container, per 318. In this way, the targeted "error causing" transactions can be recreated and detailed troubleshooting data can be collected by the firmware running at the debug level. The data collected in this manner would be much more detailed and could provide a much richer and more precise picture to a supporting engineer than the data that would be collected normally in a production environment. If the error occurs again, per 320 (i.e. in the simulated transaction), the encrypting and reporting module 310 can collect and encrypt that detailed data, per 322 and 323, respectively, and add it to the error report, per 324. If the same error is detected at 320, in the simulated environment, the occurrence of the error can indicate that the appropriate transaction(s) has or have been cloned and replayed, and thus that the data collected by the debug level firmware may be relevant to troubleshooting the particular error. If the error does not occur again, at 320, then the debug trace data need not be collected and the error report can be created per 324 by the encrypting and reporting module 310. The restricted container can then be deleted per 326, and the process can end at 328.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
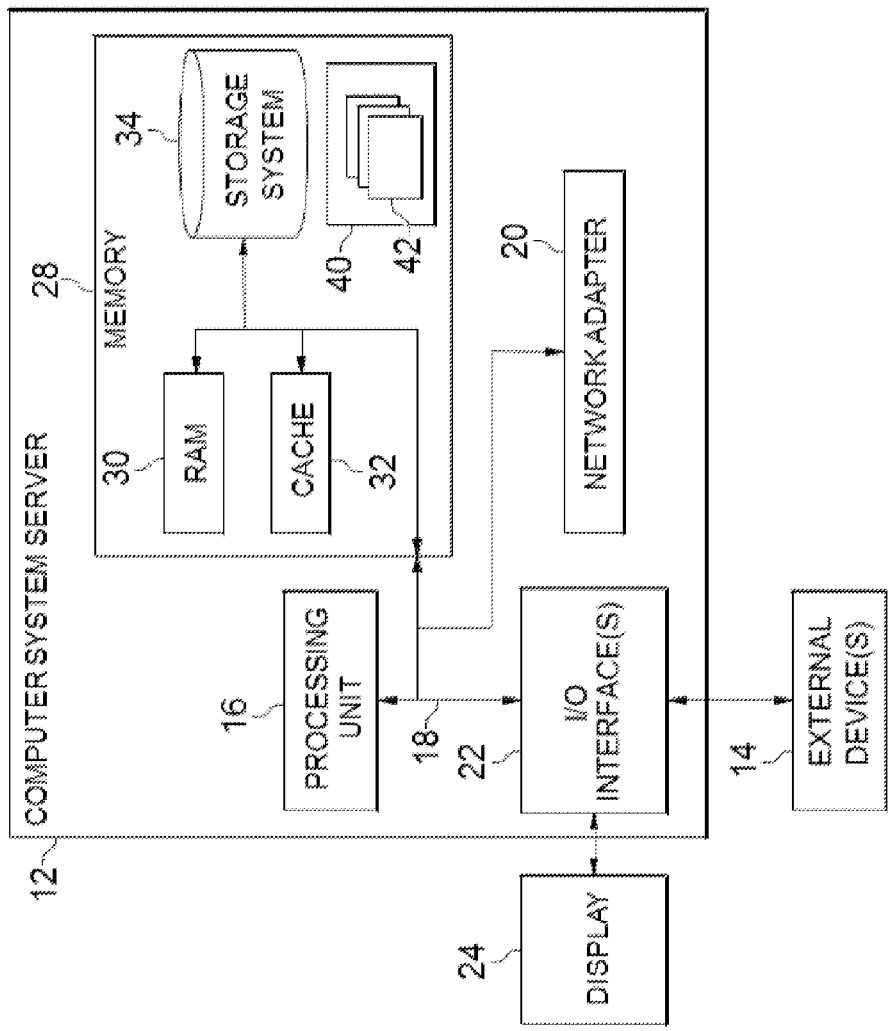
FIG. 4 depicts a cloud computing node consistent with embodiments of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
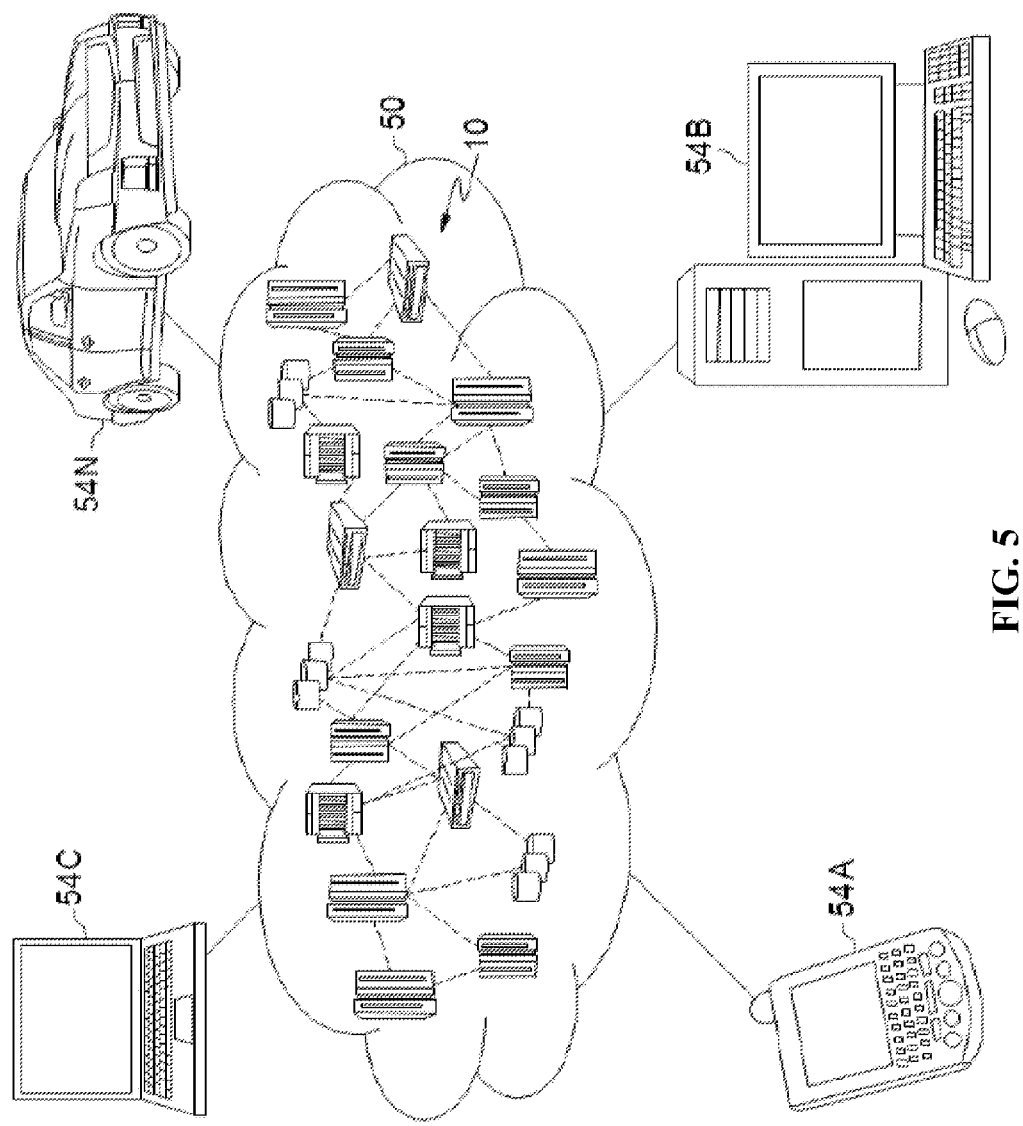
FIG. 5 depicts a cloud computing environment consistent with embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
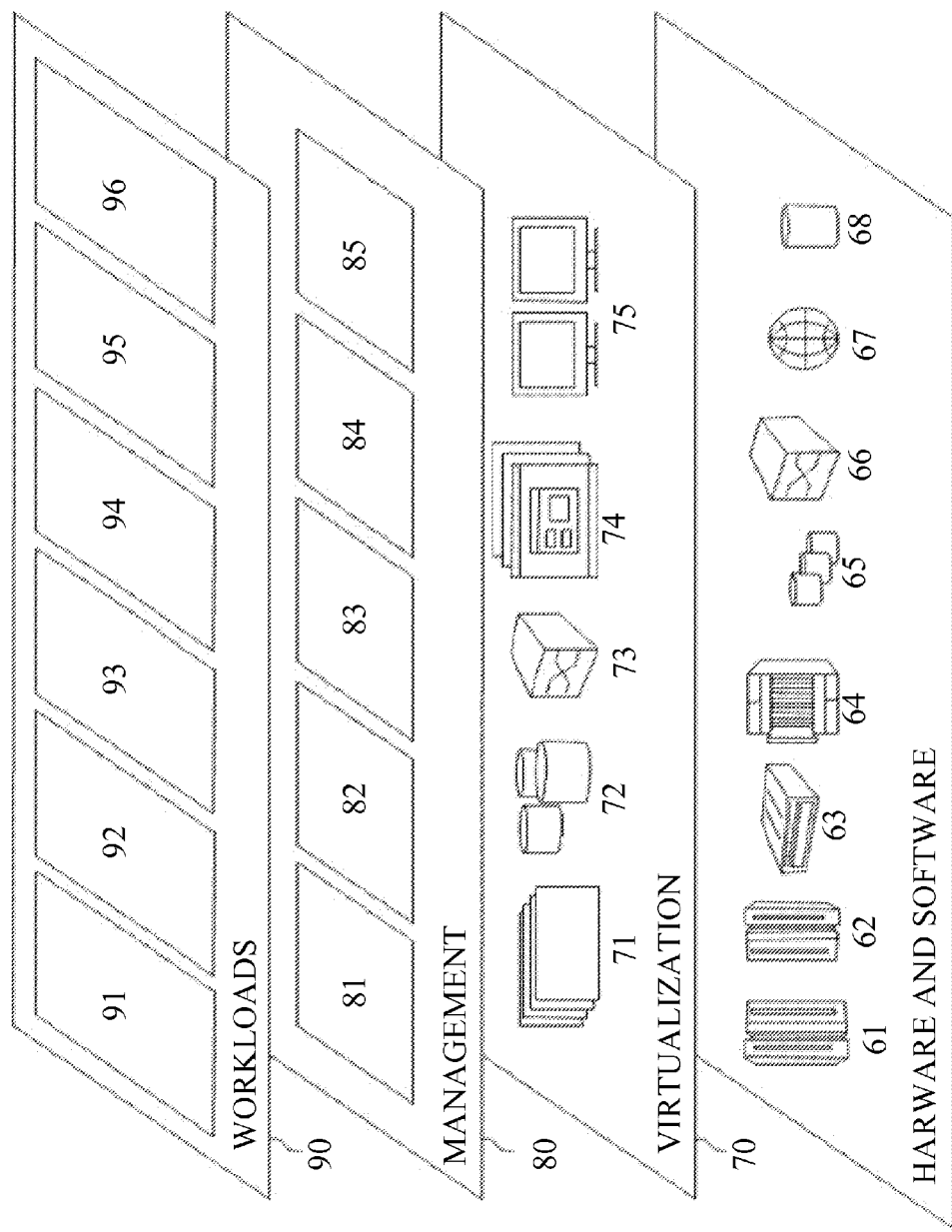
FIG. 6 depicts abstraction model layers consistent with embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, an appliance running in a production environment and a debug firmware for collecting troubleshooting data may be included in hardware and software layer 60.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. For example, a virtual application and operating system 74 may be executed in the manner disclosed herein. In some embodiments, the container in which debug firmware for collecting troubleshooting data can run may be included in virtualization layer 70.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for performing troubleshooting of an appliance running in a production environment, the method comprising:
   recording transactional data, the transactional data comprising active transactions and active user sessions for the appliance;
   determining an error has occurred in the appliance;
   copying, to a container, the recorded transactional data associated with the error, the container a restricted environment which is loaded with and can run debug firmware;
   executing, on the debug firmware in the container and based on the transactional data associated with the error, the active transactions and active user sessions associated with the error;
   collecting, throughout the executing of the active transactions and active user sessions associated with the error on the debug firmware, troubleshooting data;
   determining that the error occurs in the executing of the active transactions and active user sessions associated with the error on the debug firmware in the container;
   encrypting, in response to the determining, the troubleshooting data from the executing on the debug firmware of the active transactions and active user sessions in the container and a product key associated with the error;
   creating a report, the report including the encrypted troubleshooting data; and
   deleting the container.

2. The method of claim 1, further comprising:
   determining a second error has occurred in the appliance;
   copying, to the container, the recorded transactional data associated with the second error;
   executing, on the debug firmware in the container and based on the transactional data associated with the second error, the active transactions and active user sessions associated with the second error;
   collecting, throughout the executing of the active transactions and active user sessions associated with the second error on the debug firmware, troubleshooting data;
   determining an absence of the second error in the executing of the transaction on the debug firmware in the container;
   creating, in response to the absence of the second error, a no debug report; and
   deleting the container.

3. The method of claim 1, wherein the appliance comprises of a software application and an associated hardware.

4. The method of claim 1, wherein the appliance comprises of a software application and an associated firmware.

5. The method of claim 1, wherein the troubleshooting data collected by the debug firmware includes trace data.

6. The method of claim 1, further comprising sending, in response to the creating, the report to a product support team, for use in error correction.

7. A computer system for performing troubleshooting of an appliance running in a production environment comprising:
   at least one processor circuit comprising:
      a transaction recording module configured to:
         record transactional data, the transactional data comprising active transactions and active user sessions for the appliance;
      an error detecting module configured to:
         determine an error has occurred in the appliance;
      a network simulator module configured to:
         copy, to a container, recorded transactional data associated with the error, the container a restricted environment which is loaded with and can run debug firmware; and
         execute, on the debug firmware in the container and based on the transactional data associated with the error, the active transactions and active user sessions associated with the error; and
      an encrypting and reporting module configured to:
         collect, throughout the executing of the active transactions and active user sessions associated with the error on the debug firmware, troubleshooting data;
         determine that the error occurs in the executing of the active transactions and active user sessions on the debug firmware in the container;
         encrypt, in response to the determining, troubleshooting data from the executing on the debug firmware of the active transactions and active user sessions in the container and a product key associated with the error;
         create a report, the report including the encrypted troubleshooting data; and
         delete the container.

8. The computer system of claim 7, wherein the at least one processor circuit further comprises:
   an error detecting module configured to:
      determine a second error has occurred in the appliance;
   a network simulator module configured to:
      copy, to the container, the recorded transactional data associated with the second error; and
      execute, on the debug firmware in the container and based on the transactional data associated with the second error, the active transactions and active user sessions associated with the second error;
   an encrypting and reporting module configured to:
      collect, throughout the executing of the active transactions and active user sessions associated with the second error on the debug firmware, troubleshooting data;

determine an absence of the second error in the executing of the transaction on the debug firmware in the container;

create, in response to the absence of the second error, a no debug report; and deleting the container.

9. The computer system of claim 7, wherein the appliance comprises a software application and an associated hardware configuration.

10. The computer system of claim 7, wherein the appliance comprises a software application and an associated firmware.

11. The computer system of claim 7, wherein the troubleshooting data collected by the debug firmware includes trace data.

12. The computer system of claim 7, wherein the at least one processor circuit further comprises a delivery module configured to send, in response to the creating, the report to a product support team, for use in error correction.

13. A computer program product for performing troubleshooting of an appliance running in a production environment, the computer program product comprising a computer readable storage medium having program instructions embodied therewith, wherein the computer readable storage medium is not a transitory signal per se, the program instructions executable by a computer processing circuit to cause the circuit to perform the method comprising:

recording transactional data, the transactional data comprising active transactions and active user sessions for the appliance;

determining an error has occurred in the appliance;

copying, to a container, the recorded transactional data associated with the error, the container a restricted environment which is loaded with and can run debug firmware;

executing, on the debug firmware in the container and based on the transactional data associated with the error, the active transactions and active user sessions associated with the error;

collecting, throughout the executing of the active transactions and active user sessions associated with the error on the debug firmware, troubleshooting data;

determining that the error occurs in the executing of the active transactions and active user sessions associated with the error on the debug firmware in the container;

encrypting, in response to the determining, the troubleshooting data from the executing on the debug firmware of the active transactions and active user sessions in the container and a product key associated with the error;

creating a report, the report including the encrypted troubleshooting data; and deleting the container.

14. The computer program product of claim 13, further comprising:

determining a second error has occurred in the appliance;

copying, to the container, the recorded transactional data associated with the second error;

executing, on the debug firmware in the container and based on the transactional data associated with the second error, the active transactions and active user sessions associated with the second error;

collecting, throughout the executing of the active transactions and active user sessions associated with the second error on the debug firmware, troubleshooting data;

determining an absence of the second error in the executing of the transaction on the debug firmware in the container;

creating, in response to the absence of the second error, a no debug report; and deleting the container.

15. The computer program product of claim 13, wherein the appliance comprises of a software application and an associated hardware.

16. The computer program product of claim 13, wherein the appliance comprises of a software application and an associated firmware.

17. The computer program product of claim 13, wherein the troubleshooting data collected by the debug firmware includes trace data.

18. The computer program product of claim 13, further comprising sending, in response to the creating, the report to a product support team, for use in error correction.

* * * * *